(12) United States Patent
Valente (10) Patent No.: US 9,163,715 B2
(45) Date of Patent: Oct. 20, 2015

(54) CLUTCHED POWER TRANSMITTING DEVICE WITH FILTER ELEMENT

(71) Applicant: American Axle & Manufacturing, Inc., Detroit, MI (US)

(72) Inventor: Paul J. Valente, Berkley, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 14/608,312

(22) Filed: Jan. 29, 2015

(65) Prior Publication Data

US 2015/0141192 A1 May 21, 2015

Related U.S. Application Data

(63) Continuation-in-part of application No. 14/464,029, filed on Aug. 20, 2014.

(60) Provisional application No. 61/869,415, filed on Aug. 23, 2013.

(51) Int. Cl.
| | |
|---|---|
| *F16H 57/04* | (2010.01) |
| *F16D 13/74* | (2006.01) |
| *F16H 48/22* | (2006.01) |
| *F16H 48/06* | (2006.01) |

(52) U.S. Cl.
CPC ............ *F16H 57/0404* (2013.01); *F16D 13/74* (2013.01); *F16H 48/06* (2013.01); *F16H 48/22* (2013.01); *F16H 57/042* (2013.01); *F16H 57/0427* (2013.01); *F16H 57/0483* (2013.01)

(58) Field of Classification Search
CPC ............ F16H 57/0404; F16H 57/0483; F16H 57/0427; F16H 48/06; F16H 57/042; F16H 48/22; F16D 13/74
See application file for complete search history.

(56) References Cited

U.S. PATENT DOCUMENTS

| | | |
|---|---|---|
| 2,138,169 A | 11/1938 | Hunt |
| 2,270,482 A | 1/1942 | Stolte |
| 2,359,104 A | 9/1944 | Geyer |
| 2,359,184 A | 9/1944 | Wolfram |
| 3,128,639 A | 4/1964 | Hein |
| 3,366,210 A | 1/1968 | Webster |
| 3,366,211 A | 1/1968 | May |
| 3,768,613 A | 10/1973 | Brunner |
| 3,884,335 A | 5/1975 | Ashfield et al. |

(Continued)

FOREIGN PATENT DOCUMENTS

KR    20020084591 A    11/2002

*Primary Examiner* — Derek D Knight
(74) *Attorney, Agent, or Firm* — Harness, Dickey & Pierce, P.L.C.

(57) ABSTRACT

A power transmitting device can include a clutch, filter and housing defining first and second sumps spaced apart by a first wall. First and second members can meshingly engage and rotate through the first sump. The clutch plates can rotate through the second sump. A third member can be drivingly coupled to the second member and clutch plates. An outer surface of the third member and the first wall can define an annular cavity that fluidly couples the sumps. The filter can be received in the annular cavity about the third member and can include a second wall, outer portion, inner portion, and a filter element. The second wall can define an aperture. The outer portion can seal with the first wall. The inner portion can seal with the outer surface. The filter element can span the aperture to permit fluid communication between the sumps and inhibit passage of solids.

20 Claims, 3 Drawing Sheets

(56) References Cited

U.S. PATENT DOCUMENTS

| | | | |
|---|---|---|---|
| 4,023,661 A | 5/1977 | Flotow | |
| 4,085,835 A | 4/1978 | Bailey | |
| 4,270,647 A * | 6/1981 | Leber | 192/113.35 |
| 4,282,961 A | 8/1981 | Roscoe | |
| 4,382,497 A | 5/1983 | Sakai et al. | |
| 4,413,716 A | 11/1983 | Newsome et al. | |
| 4,458,793 A | 7/1984 | Riese et al. | |
| 4,488,626 A | 12/1984 | Handke | |
| 4,529,074 A | 7/1985 | Alas | |
| 4,544,055 A | 10/1985 | Kronstadt | |
| 4,751,989 A | 6/1988 | Shinokawa et al. | |
| 4,873,880 A | 10/1989 | Amedei et al. | |
| 4,886,153 A | 12/1989 | Takenaka et al. | |
| 4,943,068 A | 7/1990 | Hatch et al. | |
| 5,131,514 A | 7/1992 | Machida | |
| 5,137,624 A | 8/1992 | Klotz | |
| 5,411,123 A | 5/1995 | Rej et al. | |
| 5,509,666 A | 4/1996 | Abraham et al. | |
| 5,518,098 A | 5/1996 | Zanetel et al. | |
| 6,189,669 B1 | 2/2001 | Kremer et al. | |
| 6,296,590 B1 | 10/2001 | Gassmann | |
| 6,543,596 B2 | 4/2003 | Martin et al. | |
| 6,550,595 B2 | 4/2003 | Kuczera | |
| 6,595,338 B2 | 7/2003 | Bansbach et al. | |
| 6,688,433 B1 * | 2/2004 | Hauser et al. | 184/6.24 |
| 6,691,511 B1 * | 2/2004 | Phanco et al. | 60/464 |
| 6,837,817 B2 | 1/2005 | Mori et al. | |
| 6,840,363 B2 | 1/2005 | Braford, Jr. et al. | |
| 6,883,657 B2 | 4/2005 | Bansbach et al. | |
| 6,997,299 B2 | 2/2006 | Brissenden et al. | |
| 7,001,298 B2 | 2/2006 | Biermann et al. | |
| 7,111,716 B2 | 9/2006 | Ekonen et al. | |
| 7,294,086 B2 | 11/2007 | Brissenden et al. | |
| 7,416,069 B2 | 8/2008 | Tiesler | |
| 7,540,212 B2 | 6/2009 | Oki et al. | |
| 7,568,568 B2 * | 8/2009 | Porter et al. | 192/35 |
| 7,673,730 B2 | 3/2010 | Metzinger et al. | |
| 7,717,244 B2 | 5/2010 | Rowell | |
| 7,832,735 B2 | 11/2010 | Paykin | |
| 7,966,901 B2 | 6/2011 | Metzinger et al. | |
| 7,993,232 B2 | 8/2011 | Millar | |
| 8,052,151 B2 | 11/2011 | Kurth | |
| 8,215,440 B2 * | 7/2012 | Hoffmann et al. | 180/247 |
| 8,469,854 B1 * | 6/2013 | Downs et al. | 475/221 |
| 8,795,126 B2 * | 8/2014 | Downs et al. | 475/225 |
| 8,986,148 B2 * | 3/2015 | Downs et al. | 475/204 |
| 2002/0144851 A1 | 10/2002 | Porter | |
| 2004/0106487 A1 | 6/2004 | Mori et al. | |
| 2006/0163018 A1 | 7/2006 | Ekonen et al. | |
| 2008/0128212 A1 | 6/2008 | Utzat et al. | |
| 2008/0214355 A1 | 9/2008 | Capito et al. | |
| 2009/0020300 A1 | 1/2009 | Braddock | |
| 2010/0274456 A1 | 10/2010 | Kondo et al. | |
| 2012/0061184 A1 * | 3/2012 | Craft et al. | 184/6.12 |
| 2013/0303326 A1 * | 11/2013 | Downs et al. | 475/221 |
| 2013/0337960 A1 * | 12/2013 | Valente et al. | 475/198 |
| 2015/0057124 A1 * | 2/2015 | Pump | 475/160 |

* cited by examiner

CLUTCHED POWER TRANSMITTING DEVICE WITH FILTER ELEMENT

CROSS-REFERENCE TO RELATED APPLICATIONS

This application is a continuation-in-part of U.S. patent application Ser. No. 14/464,029 filed on Aug. 20, 2014. The entire disclosure of the above application is incorporated herein by reference.

FIELD

The present disclosure relates to a clutched power transmitting device having a filter element.

BACKGROUND

This section provides background information related to the present disclosure which is not necessarily prior art.

Power transmitting components with a torque transfer device, such as a disconnecting drive module in an all-wheel drive ("AWD") system, generally includes an input gearset and at least one clutch with a plurality of friction plates and a piston for selectively engaging the friction plates. The input gearset generally includes an input pinion gear meshingly engaged with a ring gear of an input member. The input member is drivingly coupled to an input of the clutch and the friction plates are configured to transmit torque between the input of the clutch to an output of the clutch when the clutch is engaged. The friction plates rotate through a fluid in a clutch sump to provide lubrication and cooling of the plates when the clutch is engaged. The input gearset rotates through a fluid in a gear sump to provide lubrication and cooling of the gears within the input gearset. Conventionally, the clutch sump and gear sump are separated by seals that inhibit the exchange of fluid between the two sumps.

SUMMARY

This section provides a general summary of the disclosure, and is not a comprehensive disclosure of its full scope or all of its features.

The present teachings provide for a power transmitting device including a housing, a fluid, a first member, a second member, a clutch assembly, a third member, and a filter. The housing can have a first wall. The housing can define a first sump and a second sump spaced apart from the first sump by the first wall. The fluid can be received in the first and second sumps. The first member can be received in the housing and can be configured for rotation relative to the housing. The second member can be received in the housing and can be configured for rotation relative to the housing. The second member can be meshingly engaged with the first member and can be configured to rotate through the first sump. The clutch assembly can include a plurality of first clutch plates and a plurality of second clutch plates which can interleave with the plurality of first clutch plates. The first and second clutch plates can be configured to rotate through the second sump. The third member can have an outer surface. The third member can be drivingly coupled to the second member and the first clutch plates. The outer surface and the first wall can define an annular cavity that can fluidly couple the first and second sumps. The filter can be disposed about the third member and can be received in the annular cavity. The filter can include a second wall, an outer portion, an inner portion, and at least one filter element. The second wall can extend radially between the first wall and the outer surface of the third member. The second wall can define at least one aperture that can extend axially through the second wall. The outer portion can be coupled to the second wall and can be in sealing contact with the first wall. The inner portion can be coupled to the second wall and can be in sealing contact with the outer surface of the third member. The at least one filter element can span the at least one aperture. The filter element can be configured to permit fluid communication of the fluid between the first and second sumps through the at least one aperture and can inhibit passage of solid particulates.

The present teachings further provide for a power transmitting device including a housing, a fluid, a first member, a second member, a clutch assembly, a third member and a filter. The housing can have a first wall. The housing can define a first sump and a second sump that can be spaced apart from the first sump by the first wall. The fluid can be received in the first and second sumps. The first member can be received in the housing and can be configured for rotation relative the housing. The second member can be meshingly engaged with the first member and can be configured to rotate through the first sump. The clutch assembly can have a plurality of first clutch plates and a plurality of second clutch plates that can be interleaved with the first clutch plates. The first and second clutch plates can be configured to rotate through the second sump. The third member can have an outer surface and can be drivingly coupled to the second member and the plurality of first clutch plates. The outer surface and the first wall can define an annular cavity that can be fluidly coupled to the first and second sumps. The filter can be disposed about the third member and can be received in the annular cavity. The filter can include an outer portion that can be in sealing contact with the first wall. The inner portion can be in sealing contact with the outer surface of the third member. The plurality of spokes can extend radially between the outer and inner portions. The at least one filter element can span between the plurality of spokes. The filter element can be configured to permit fluid communication of the fluid between the first and second sumps and can inhibit passage of solid particulates between the first and second sumps.

The present teachings further provide for a power transmitting device including an input pinion, a housing, a fluid, an input member, a first output member, a differential, a clutch, an intermediate member, and a filter. The input pinion can be configured for rotation about a first axis. The housing can have a first wall and can define a first cavity and a second cavity that can be separated from the first cavity by the first wall. The fluid can be received in the first and second cavities. The input member can be received in the first cavity and can be configured for rotation about a second axis. The input member can be meshingly engaged with the input pinion and can include a first output member and a second output member. The differential can include a differential case and a differential gearset. The differential case can be configured to be drivingly coupled to the input member. The differential gearset can be configured to transmit rotary power between the differential case and the first and second output members. The clutch assembly can be received in the second cavity and can include a plurality of first clutch plates and a plurality of second clutch plates that can be interleaved with the plurality of the first clutch plates. The intermediate member can be received through the first wall and can have an outer surface. The intermediate member can be configured for rotation relative to the housing about the second axis and can be drivingly coupled to the input member and the plurality of first clutch plates. The outer surface of the intermediate member and an inner surface of the first wall can define an annular cavity that can fluidly couple the first and second cavities. The filter can be received in the annular cavity and can include a first body, at least one filter element, and a second body. The first body can have a disc and a flange. The disc can define a first aperture and at least one second aperture. The intermediate member can be received through the first aperture. The second aperture can be radially between the first aperture and the flange and can extend axially through the disc. The flange can extend from the disc in a first axial direction and can be configured to form a seal with the inner surface of the first wall. The filter element can span the second aperture. The filter element can be configured to permit fluid communication of the fluid between the first and second cavities through the second aperture and can inhibit passage of solid particulates between the first and second cavities. The second body can be coupled to the disc and can be configured to form a seal with the outer surface of the intermediate member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
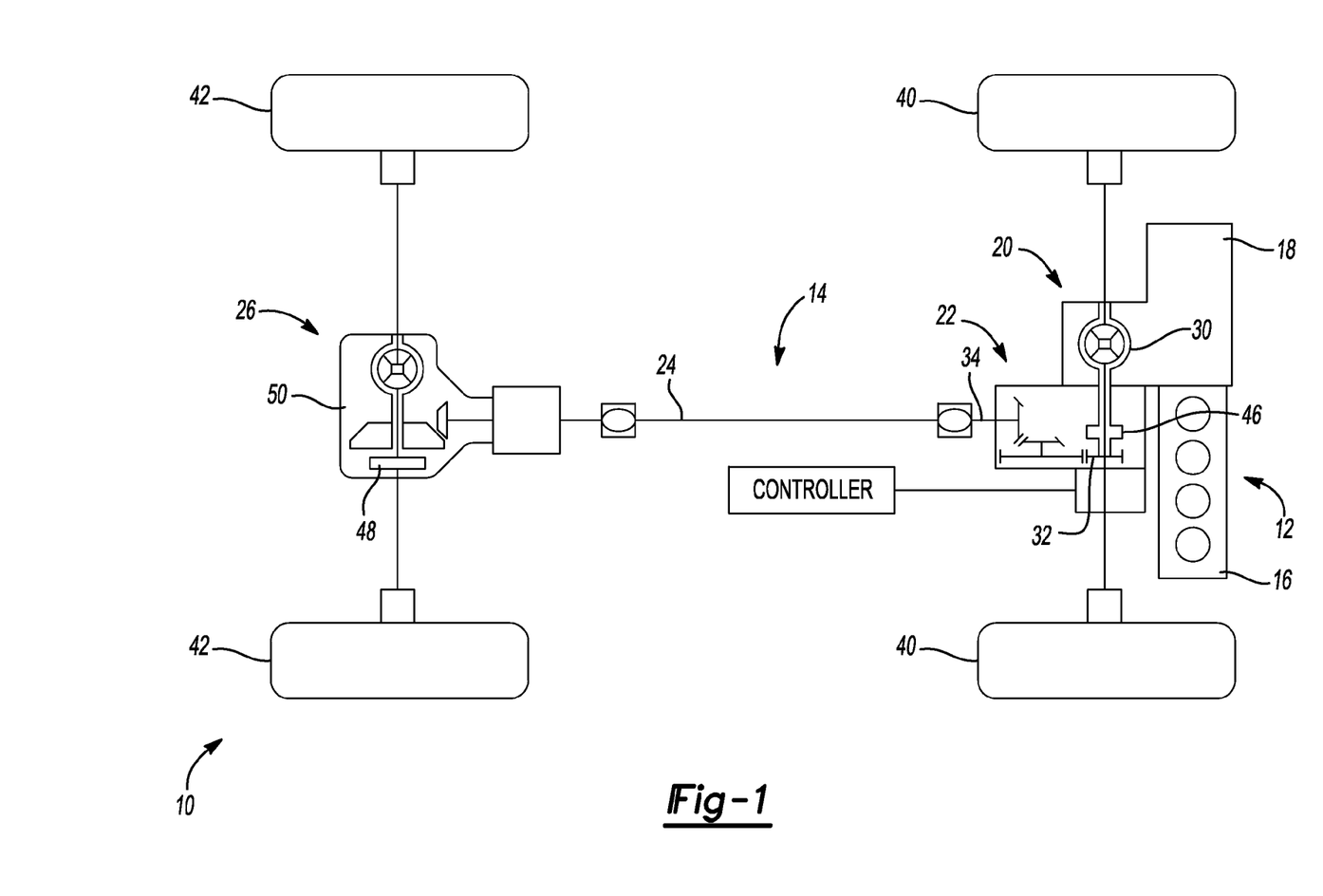
FIG. 1 is a schematic view of a vehicle having a power transmitting device constructed in accordance with the present teachings.

With reference to FIG. 1 of the drawings, an example of a vehicle having a power transmitting device constructed in accordance with the teachings of the present disclosure is generally indicated by reference numeral 10. The vehicle 10 can have a power train 12 and a drive line or drive train 14. The power train 12 can be conventionally constructed and can comprise a power source 16 and a transmission 18. The power source 16 can be configured to provide propulsive power and can comprise an internal combustion engine and/or an electric motor, for example. The transmission 18 can receive propulsive power from the power source 16 and can output power to the drive train 14. The transmission 18 can have a plurality of automatically or manually-selected gear ratios. The drive train 14 in the particular example provided is of an all-wheel drive ("AWD") configuration, but those of skill in the art will appreciate that the teachings of the present disclosure are applicable to other drive train configurations, including four-wheel drive ("4WD") configurations, two-wheel drive ("2WD"), rear-wheel drive configurations ("RWD"), and front-wheel drive ("FWD") configurations. The drive train 14 can include a front axle assembly 20, a power take-off unit (PTU) 22, a prop shaft 24 and a rear axle assembly 26. The front axle assembly 20 can be configured in any desired manner, such as a front beam axle or an independent front drive axle. An output of the transmission 18 can be coupled to an input of the front axle assembly 20 to drive an input member 30 of the front axle assembly 20. The PTU 22 can have a PTU input member 32, which can receive rotary power from the input member 30 of the front axle assembly 20, and a PTU output member 34 that can transmit rotary power to the prop shaft 24. The prop shaft 24 can couple the PTU output member 34 to the rear axle assembly 26 such that rotary power output by the PTU 22 is received by the rear axle assembly 26. The rear axle assembly 26 can be configured in any desired manner, such as a rear beam axle, an independent rear drive axle, or a rear drive module. The front axle assembly 20 and the rear axle assembly 26 can be driven on a full-time basis to drive front and rear vehicle wheels 40 and 42, respectively. The drive train 14 can include one or more clutches to interrupt the transmission of rotary power through a part of the drive train 14. In the particular example provided, the drive train 14 includes a first clutch 46, which can be configured to interrupt the transmission of rotary power through the PTU 22 (e.g., decouple the input member 30 of the front axle assembly 20 from the PTU input member 32), and a second clutch 48, which can be configured to control rotation of components within the rear axle assembly 26.

In the particular example provided, the rear axle assembly 26 includes a rear drive module 50 (i.e., a power transmitting device) that is constructed in accordance with the teachings of the present disclosure. It will be appreciated, however, that the teachings of the present disclosure have application to various other clutched devices, such as transmissions, power take-offs, torque transfer devices, transfer cases, front axle assemblies, and any other power transmitting components that have a housing forming separate sumps spanned by a rotating member.

Figure 2:
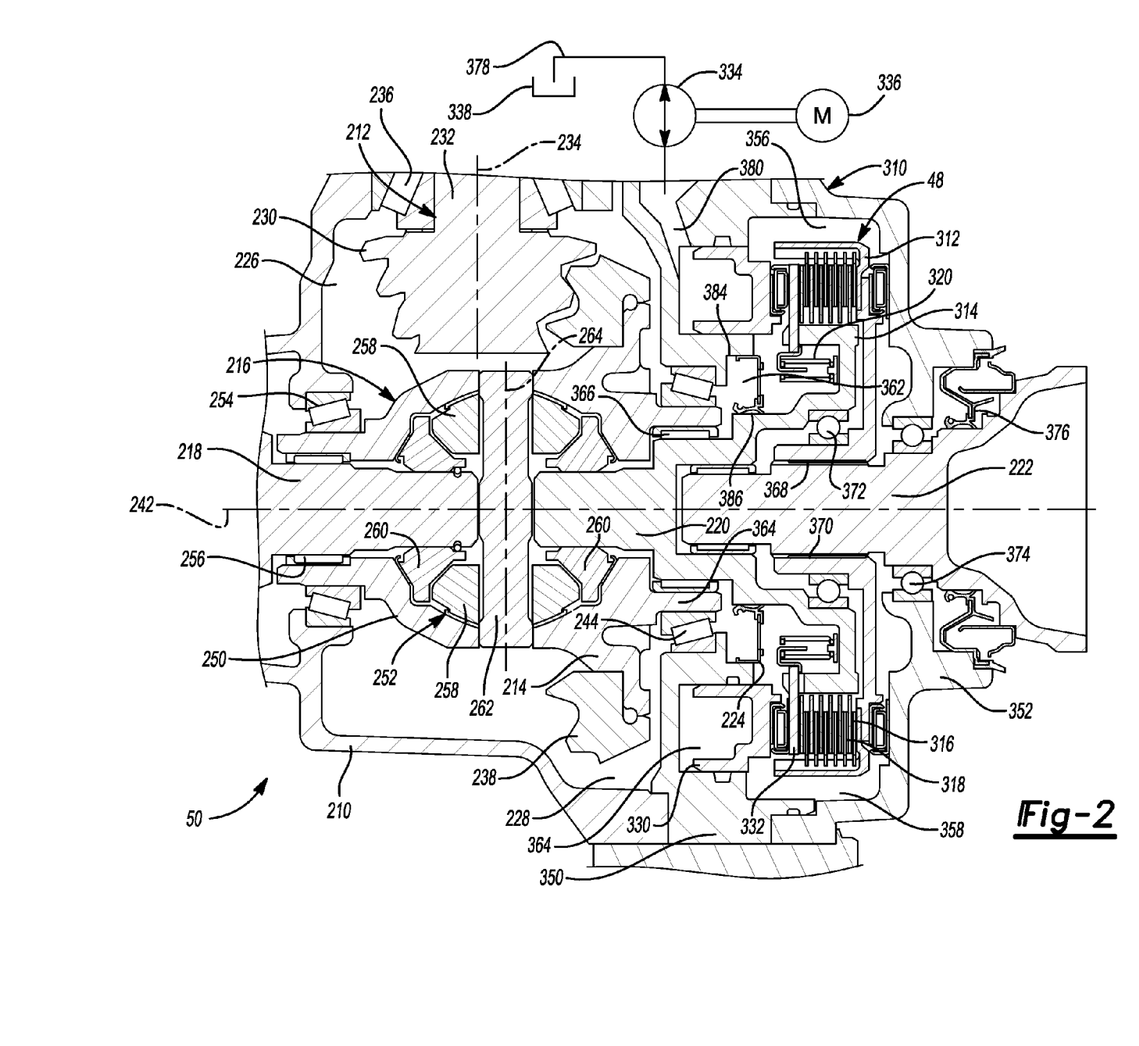
FIG. 2 is a sectional view of the power transmitting device of FIG. 1, illustrating a clutch sump, a gear sump, and a filter.

With reference to FIG. 2, the rear drive module 50 is illustrated in more detail. In the particular example provided, the rear drive module 50 is a type known as a split-shaft drive module. It will be appreciated, however, that the teachings of the present disclosure have application to various other types of drive modules. The rear drive module 50 can include a housing 210, an input pinion 212, an input member 214, the second clutch 48, a differential assembly 216, a first output shaft 218, a second output shaft 220, a third output shaft 222, and a filter 224. The housing 210 can define a first cavity 226 including a gear sump or first sump 228. The first sump 228 can be located at a bottom of the first cavity 226 and configured to hold a volume of a lubricant fluid (not shown). The input pinion 212 can be a hypoid pinion having a hypoid gear 230, an input pinion shaft 232, and an input pinion flange (not shown). The input pinion flange can be drivingly coupled to the prop shaft 24 (FIG. 1). The hypoid gear 230 can be disposed within the first cavity 226. The input pinion shaft 232 can be supported for rotation in the housing 210 along a first axis 234 by a head bearing 236 proximate to the hypoid gear 230 and a tail bearing (not shown) distal to the hypoid gear 230 and proximate to the input pinion flange and prop shaft 24 (FIG. 1). The input member 214 can be a ring gear having a gear face 238. The input member 214 can be supported for rotation in the housing 210 about a second axis 242 by a bearing 244, such that the gear face 238 can rotate through the fluid in the first sump 228 to lubricate the gear face 238. The second axis 242 can be generally transverse or perpendicular to the first axis 234. The gear face 238 can be meshingly engaged with the hypoid gear 230 to form a hypoid gearset.

The differential assembly 216 can include a differential case 250 and a differential gearset 252. The differential case 250 can be configured for rotation about the second axis 242. The differential case 250 can be drivingly coupled to the input member 214, and in the example provided is integrally formed with the input member 214. The differential case 250 can be supported within the housing 210 by a bearing 254 and can be coupled to the input member 214 for common rotation about the second axis 242. In the example provided, the first output shaft 218 is supported for rotation within the differential case 250 by a bushing or bearing 256 located radially between a portion of the differential case 250 and the first output shaft 218, though other configurations can be used. The differential gearset 252 can be configured to transmit rotary power between the differential case 250 and the first and second output shafts 218, 220. In the example provided, the differential gearset 252 includes a pair of side gears 258 and a pair of output gears 260 disposed within the differential case 250. The side gears 258 can be coupled for rotation with the differential case 250 about the second axis 242 and coupled for rotation relative to the differential case 250 about a cross pin 262. The cross pin 262 can be disposed about a third axis 264 that can be generally perpendicular to the second axis 242. The output gears 260 can be meshingly engaged with the side gears 258 and configured to rotate about the second axis 242. The first output shaft 218 can be drivingly coupled to one of the output gears 260 and can be coupled for common rotation therewith. The first output shaft 218 can be drivingly coupled to one of the rear wheels 42 (FIG. 1). The second output shaft 220 can be drivingly coupled to the other of the output gears 260 and can be coupled for common rotation therewith. The third output shaft 222 can be drivingly coupled to the other one of the rear wheels 42 (FIG. 1).

The second clutch 48 can be selectively operated to transmit rotary power from the second output shaft 220 to the third output shaft 222. In the particular example provided, the second clutch 48 is a friction clutch that is mounted co-axially with the input member 214 and the differential assembly 216 about the second axis 242. The second clutch 48 can include a clutch housing 310, an outer clutch plate carrier 312, an inner clutch plate carrier 314, a plurality of first clutch plates 316, a plurality of second clutch plates 318, a biasing device 320, a piston 330, an apply plate 332, a pump 334, a pump motor 336, and a reservoir 338. The clutch housing 310 can be integrally formed with or partially formed by the housing 210 of the rear drive module 50 or can be separately formed and mounted to the housing 210. In the example provided, the clutch housing 310 is separately formed from the housing 210 and includes a first wall or shell 350 and a second shell 352. The first shell 350 can be mounted to the housing 210. The first and second shells 350, 352 can be coupled together to define a second cavity 356 including a clutch sump or second sump 358. The second sump 358 can be located at a bottom of the second cavity 356 and configured to hold a second volume of the lubricant fluid. The first shell 350 can generally separate the first cavity 226 from the second cavity 356 to generally separate the first sump 228 from the second sump 358. The first shell 350 can also define a piston chamber 360 and can partially define an annular cavity 362. The annular cavity 362 can be radially inward of the piston chamber 360 and can extend between and be generally open to the first and second cavities 226, 356. In the example provided, the annular cavity 362 is defined by the first shell 350, a portion 364 of the input member 214, and the second output shaft 220, though it is understood that the annular cavity 362 can be defined by other configurations of the input member 214 and/or the second output shaft 220, such as the construction disclosed in co-pending U.S. application Ser. No. 14/464,029, the entire disclosure of which is incorporated herein by reference. In the example provided, the bearing 244 is disposed within the annular cavity 362, radially between the portion 364 of the input member 214 and the first shell 350 to support the input member 214 for rotation relative to the first shell 350. In the example provided, the bearing 244 is a tapered roller bearing, though other suitable types of bearings can be used. The bearing 244 can be configured to allow lubricant fluid to pass through the annular cavity 362 between the first and second cavities 226, 356 and thus between the first and second sumps 228, 358.

The outer and inner clutch plate carriers 312, 314 and the first and second clutch plates 316, 318 can be received in the second cavity 356. One of the outer and inner clutch plate carriers 312, 314 can be non-rotatably coupled to the third output shaft 222 and the plurality of first clutch plates 316. The other of the outer and inner clutch plate carriers 312, 314 can be non-rotatably coupled to the second output shaft 220 and the plurality of second clutch plates 318. In the particular example provided, the outer clutch plate carrier 312 is non-rotatably coupled to the third output shaft 222 and the plurality of first clutch plates 316, while the inner clutch plate carrier 314 is non-rotatably coupled to the second output shaft 220 and the plurality of second clutch plates 318. In the particular example provided, the inner clutch plate carrier 314 and the second output shaft 220 are unitarily formed, though other configurations can be used such as fasteners, splines, or welds for example.

The inner clutch plate carrier 314 and the second output shaft 220 can be supported within the clutch housing 310 for rotation relative thereto by a bushing or bearing 366. In the example provided the bearing 366 is located radially between the second output shaft 220 and the portion 364 of the input member 214. In the example provided, the portion 364 of the input member 214 is radially between bearing 244 and bearing 366 and bearings 244 and 366 are generally axially aligned, though other configurations can be used.

In the example provided, the outer clutch plate carrier 312 includes a set of interior splines 368 that are meshingly engaged with a set of exterior splines 370 formed on the third output shaft 222 to non-rotatably couple the third output shaft 222 and the outer clutch plate carrier 312. The outer clutch plate carrier 312 can be supported for rotation relative to the inner clutch plate carrier 314 by a bearing 372 disposed radially between the inner and outer clutch plate carriers 312, 314, and the third output shaft 222 can be supported for rotation relative to the clutch housing 310 by a bearing 374 disposed radially between the third output shaft 222 and the second shell 352, though other configurations can be used. A seal 376 can be disposed radially between the third output shaft 222 and the second shell 352, and axially outward of the bearing 374. In the example provided, the seal 376 is a radial lip seal configured to retain fluid within the second cavity 356 and inhibit debris from entering the second cavity 356 from outside the clutch housing 310.

The second clutch plates 318 can be interleaved with the first clutch plates 316 radially between the outer and inner clutch plate carriers 312, 314 and configured to rotate through the second sump 358. The piston 330 can be received in the piston chamber 360 and configured to translate along the second axis 242. The piston 330 can be configured to move within the piston chamber 360 between an extended position and a retracted position relative to the plurality of first and second clutch plates 316, 318. While schematically shown in FIG. 2, the pump 334 can be mounted to the housing 210 or the clutch housing 310 or can be remote from the housing 210 and clutch housing 310. The pump motor 336 can be a 2-way servo motor capable of running in forward and reverse and can be drivingly coupled to the pump 334 to selectively operate the pump 334.

The pump 334 can be fluidly coupled to the reservoir 338 by a first pump conduit 378 and fluidly coupled to the piston chamber 360 by a second pump conduit 380. In the example provided, the second pump conduit 380 is defined by the clutch housing 310. While schematically shown in FIG. 2 the first pump conduit 378 can also be defined by the clutch housing 310 and/or the housing 210. The reservoir 338 can be configured to hold a hydraulic fluid. The pump 334 can be operated in a first mode to pump the hydraulic fluid in a first direction to supply the hydraulic fluid from the reservoir 338 to the piston chamber 360 to move the piston 330 from the retracted position to the extended position. The pump 334 can be operated in a second mode to pump hydraulic fluid in a second direction to selectively remove hydraulic fluid from the piston chamber 360 to the reservoir 338 to move the piston 330 from the extended position to the retracted position. While schematically shown in FIG. 2, the reservoir 338 can be mounted to the housing 210 or the clutch housing 310. Alternatively, the reservoir 338 can be integrally formed with the housing 210 or the clutch housing 310 or remote to the housing 210 and clutch housing 310. The reservoir 338 can also include a vent (not shown) that can vent gasses to the atmosphere or another part of the rear drive module 50 for example.

The apply plate 332 can be disposed in the second cavity 356 between the piston 330 and the plurality of first and second clutch plates 316, 318. The piston 330 can be configured to translate the apply plate 332 along the second axis 242 to selectively engage the first and second clutch plates 316, 318 to compress the first and second clutch plates 316, 318 against one another so that the second clutch 48 can transmit rotary power between the second and third output shafts 220, 222. It will be appreciated that the second clutch 48 can be configured to not transmit rotary power between the second and third output shafts 220, 222 when the piston 330 is in the retracted position. The second clutch 48 can also be configured to transmit various levels of torque by varying the position of the piston 330 relative to the first and second clutch plates 316, 318. The apply plate 332 can be biased toward the piston 330 by the biasing device 320. The biasing device 320 can be any type of device suitable for biasing the apply plate 332 toward the piston 330, such as a spring for example. The biasing device 320 can bias the piston 330 toward the retracted position.

The filter 224 can be disposed within the annular cavity 362 coaxial with the second axis 242 and can be configured to permit lubricant fluid to pass through the filter 224 between the first and second cavities 226, 356, while inhibiting solid particulates from passing between the first and second cavities 226, 356. In the particular example provided, the filter 224 can contact an inner surface 384 of the first shell 350 and an outer surface 386 of the second output shaft 220 to span radially across the annular cavity 362, though other constructions can be used. In another example not specifically shown, the filter 224 can contact and span between the first shell 350 and the portion 364 of the input member 214. The interfaces between the filter 224 and the inner surface 384 and the outer surface 386 can be configured to form a seal sufficient to inhibit solid particulates from passing between the filter 224 and the first shell 350 and the second output shaft 220, though the interfaces do not need to prevent liquid transfer therebetween. The filter 224 can be axially between the bearing 244 and the second sump 358 to inhibit particulates from the second sump 358 from contacting the bearing 244.

Figure 3:
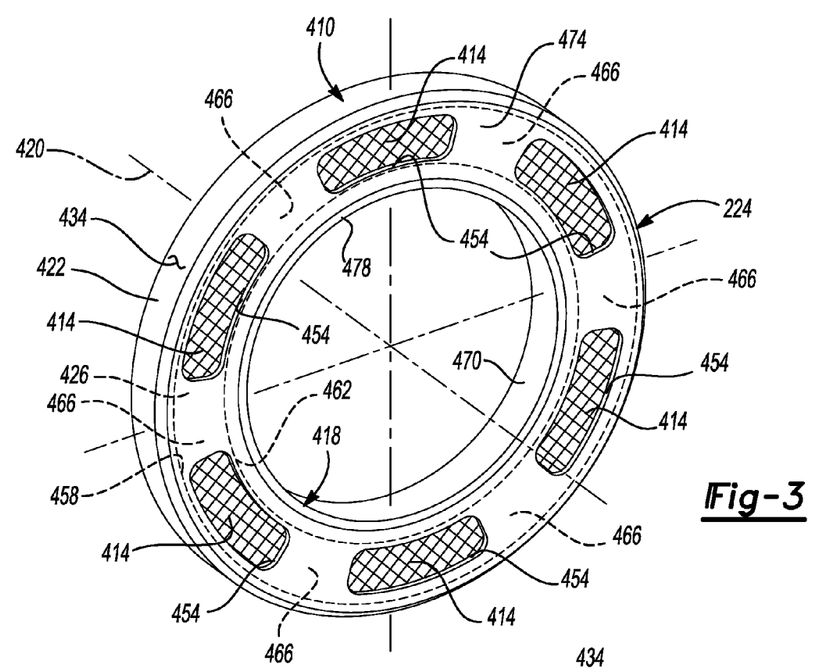
FIG. 3 is a perspective view of the filter of FIG. 2.
Figure 4:
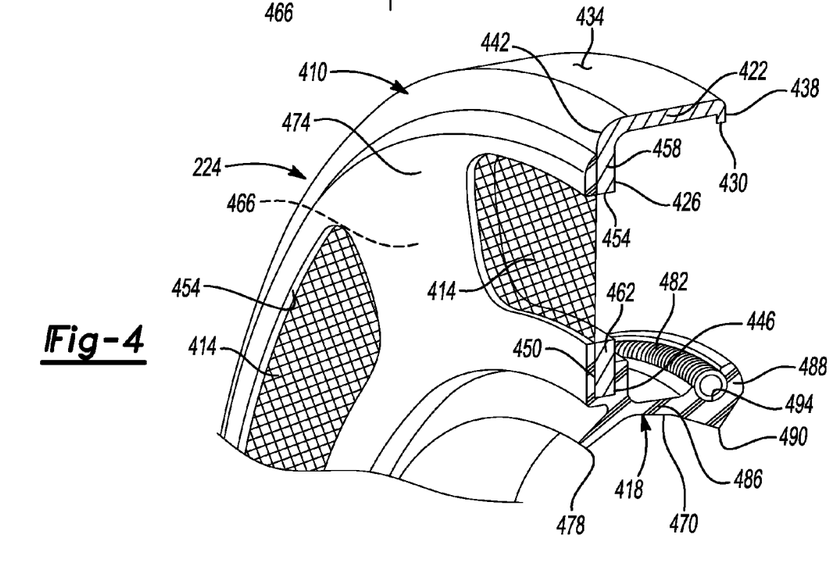
FIG. 4 is a perspective sectional view of a portion of the filter of FIG. 2.

With additional reference to FIGS. 3 and 4, the filter 224 is shown in greater detail. The filter 224 can include the first body 410, at least one filter element or screen 414, and a second body or seal element 418. In the example provided, the first body 410 is formed of a stamped piece of metal, such as steel or aluminum, though other constructions or materials can be used. The first body 410 can be an annular shape disposed circumferentially about an axis 420 and can include an flange 422, a wall 426, and a flange lip 430. The flange 422 can be generally cylindrical and can have an outer surface 434 that can define the outer circumference of the filter 224. The outer surface 434 can have a maximum diameter that is greater than the diameter of the inner surface 384 such that the flange 422 and the first shell 350 have an interference fit when the filter 224 is positioned as shown in FIG. 2. The flange 422 can be non-rotationally coupled to the filter 224 and to the first shell 350, such as by friction between the outer surface 434 and the inner surface 384 for example.

The flange lip 430 can extend radially inward from a front side 438 of the flange 422. The wall 426 can extend radially inward from a back side 442 of the flange 422. In the example provided, the flange lip 430 and wall 426 are generally perpendicular to the flange 422, though other configurations can be used.

The wall 426 can have a generally disc shape having a forward face 446 and a rear face 450 can define at least one aperture 454 that extends axially through the wall 426 between the forward face 446 and rear face 450. In the example provided, the wall 426 includes an outer ring 458, an inner ring 462, and six spokes 466 that extend radially between the outer and inner rings 458, 462 to define six arcuate shaped apertures 454 that are circumferentially spaced about the wall 426, though other configurations can be used.

The filter element 414 can span or cover each of the apertures 454 and can be configured to permit lubricant fluid to flow between the first and second sumps 228, 358 through the apertures 454 while preventing solid particulates from passing through the apertures 454. In the example provided, the filter element 414 is a mesh screen structure that can inhibit solid particulates greater than the size of the mesh. In the particular example provided, the mesh size can generally be between 50 μm and 200 μm, such as 150 μm for example, though other mesh sizes can be used. The filter element 414 can be formed of any suitable material, such as being constructed of a metal wire mesh or plastic mesh for example. It is understood that the filter element 414 can be constructed of a porous material, other than a mesh screen, that is configured to permit fluid flow while blocking solid particulates. The filter element 414 can be a single, annular shaped sheet overlaid on the forward or rear face 446, 450 of the wall 426 to cover the six apertures 454 and the six spokes 466. In the particular example provided, the filter element 414 is overlaid on the rear face 450. In an alternative construction, not specifically shown, individual filter elements can be used, wherein each filter element can be configured to cover a respective one of the apertures 454.

The seal element 418 can include a flex arm 470, an outer section 474, a lip 478, and a biasing member 482. The flex arm 470, outer section 474, and lip 478 can be formed of a molded plastic or elastomeric material. In the example provided, the flex arm 470, outer section 474, and lip 478 are a unitarily formed molded piece, though other constructions can be used. The flex arm 470 and lip 478 can be constructed similar to the flex arms and lips of radial shaft seals commonly known in the art, though other constructions can be used. The flex arm 470 and lip 478 can be coupled to the inner ring 462 and can extend radially inward from the inner ring 462 and circumferentially about the axis 420 such that one or both of the flex arm 470 and lip 478 can form the radially innermost portion the filter 224. The flex arm 470 can have a first end 486 proximal to the inner ring 462 and can extend axially outward from the forward face 446 of the inner ring 462 to a second end 488 that is distal to the inner ring 462.

The second end 488 can define a sealing edge 490 and a groove 494. The sealing edge 490 can extend radially inward of the first end 486 and the surrounding areas of the second end 488. The sealing edge 490 can have an inner diameter that is less than an outer diameter of the outer surface 386 (FIG. 2) of the second output shaft 220 (FIG. 2) such that the second end 488 of the flex arm 470 and the second output shaft 220 have an interference fit when the filter 224 is positioned about the second output shaft 220 as shown in FIG. 2. The flex arm 470 can be a resilient material such that the flex arm 470 biases the sealing edge 490 radially inward and into contact with the outer surface 386 (FIG. 2) when the filter 224 is positioned as shown in FIG. 2. The groove 494 can extend circumferentially about the second end 488 and can be disposed radially outward of the sealing edge 490. The biasing member 482 can be received in the groove 494 and can extend circumferentially about the second end 488 within the groove 494. The biasing member 482 can bias the second end radially inward. In the example provided, the biasing member 482 is a coil spring commonly called a compression garter spring, though other constructions can be used.

The lip 478 can extend at an angle radially inward and axially outward from the first end 486 of the flex arm 470 in the opposite axial direction as the flex arm 470. The lip 478 can extend axially outward of the rear face 450 of the wall 426. The lip 478 can have an inner diameter that is less than the outer diameter of the outer surface 386 (FIG. 2) of the second output shaft 220 (FIG. 2) such that the lip 478 and the second output shaft 220 have an interference fit when the filter 224 is positioned about the second output shaft 220 as shown in FIG. 2. The lip 478 can be formed of a resilient material such that the lip 478 is biased radially inward and into contact with the outer surface 386 (FIG. 2) when the filter 224 is positioned as shown in FIG. 2. In an alternative configuration not specifically shown, instead of the lip 478, a second flex arm (not shown) and second biasing member (not shown) can be used. The second flex arm can be similar to the flex arm 470 but can extend axially from the rear face 450 in the opposite axial direction as the flex arm 470. The second biasing member can be similar to biasing member 482 and can be received in a groove (not shown) of the second flex arm that is similar to groove 494.

The outer section 474 can extend radially outward from the flex arm 470 and the lip 478 along the forward and rear faces 446, 450 of the inner ring 462. In the particular example provided, the filter element 414 is positioned on the rear face 450 and the outer section 474 of the seal element 418 can then be molded to the first body 410 such that the outer section 474 is molded over the filter element 414 and the rear face 450 to secure the screen to the first body 410. The outer section 474 can cover the rear face 450 of the inner ring 462, spokes 466, and the outer ring 462. In the particular example provided, the upper section does not extend radially outward to cover the entire forward face 446 of the inner ring 462, though other configurations can be used. It is understood that the filter element 414 could alternatively be positioned on the forward face 446 and the outer section 474 could similarly be molded over the filter element 414 and the forward face 446. In an alternative construction not specifically shown, the outer section 474 can also extend beyond the wall 426 and over the flange 422 of the first body 410 such that the outer section 474 can extend between the outer surface 434 and the inner surface 384 (FIG. 2) of the first shell 350 (FIG. 2) such that the outer section 474 forms the seal with the inner surface 384 (FIG. 2).

In operation, the filter 224 can permit a common lubricant fluid to be used in the first and second sumps 228, 358. The fluid can be free to flow through the annular cavity 362 between the first and second sump 228, 358 without particulates passing between the first and second sumps 228, 358. The bearing 244 can be configured to pump the lubricant fluid from the first sump 228 to the second sump 358 through the annular cavity 362 and the filter 224. A clutch evacuation system (not shown), such as one of the clutch evacuation systems disclosed in co-pending U.S. application Ser. No. 14/464,029 for example, can be used to move lubricant fluid between the first and second sumps 228, 358.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A power transmitting device comprising:
   a housing having a first wall, the housing defining a first sump and a second sump spaced apart from the first sump by the first wall;
   a fluid received in the first and second sumps;
   a first member received in the housing and configured for rotation relative to the housing;
   a second member received in the housing and configured for rotation relative to the housing, the second member being meshingly engaged with the first member and configured to rotate through the first sump;
   a clutch assembly including a plurality of first clutch plates and a plurality of second clutch plates interleaved with the plurality of first clutch plates, the first and second clutch plates being configured to rotate through the second sump;
   a third member having an outer surface, the third member being drivingly coupled to the second member and the first clutch plates, the outer surface and the first wall defining an annular cavity that fluidly couples the first and second sumps; and
   a filter disposed about the third member and received in the annular cavity, the filter including:
      a second wall extending radially between the first wall and the outer surface of the third member, the second wall defining at least one aperture extending axially through the second wall;
      an outer portion coupled to the second wall and in sealing contact with the first wall;
      an inner portion coupled to the second wall and in sealing contact with the outer surface of the third member; and
      at least one filter element spanning the at least one aperture, the filter element being configured to permit fluid communication of the fluid between the first and second sumps through the at least one aperture and to inhibit passage of solid particulates.

2. The power transmitting device of claim 1, wherein the inner portion includes an arm having a first end and a second end, the first end being coupled to the second wall, the arm extending freely in a first axial direction from the first end to the second end, the second end being in sealing contact with the outer surface of the third member.

3. The power transmitting device of claim 2, wherein the filter includes a biasing member and the second end of the arm defines a groove, the groove extending around an outer circumference of the second end, the biasing member being disposed within the groove and biasing the second end radially inward.

4. The power transmitting device of claim 2, wherein the inner portion includes a lip member, the lip member extending radially inward from the second wall and extending in a second axial direction that is opposite the first axial direction, the lip member being in sealing contact with the outer surface of the third member.

5. The power transmitting device of claim 2, wherein the outer portion extends axially from the second wall in the first axial direction.

6. The power transmitting device of claim 1, wherein the at least one aperture includes a plurality of apertures circumferentially spaced about the second wall.

7. The power transmitting device of claim 6, wherein the filter element has an annular shape, the filter element abutting a first side of the second wall and spanning each of the apertures.

8. The power transmitting device of claim 7, wherein the filter includes a cover portion coupled to the second wall, the filter element being disposed axially between the cover portion and the first side of the second wall.

9. The power transmitting device of claim 1, wherein the filter element is a mesh having a mesh size less than or equal to 200 μm and configured to inhibit passage of solid particulates greater than the mesh size through the at least one aperture.

10. A power transmitting device comprising:
    a housing having a first wall, the housing defining a first sump and a second sump that is spaced apart from the first sump by the first wall;
    a fluid received in the first and second sumps;
    a first member received in the housing and configured for rotation relative to the housing;
    a second member meshingly engaged with the first member and configured to rotate through the first sump;
    a clutch assembly having a plurality of first clutch plates and a plurality of second clutch plates that are interleaved with the first clutch plates, the first and second clutch plates being configured to rotate through the second sump;
    a third member having an outer surface and being drivingly coupled to the second member and the plurality of first clutch plates, the outer surface and the first wall defining an annular cavity that fluidly couples the first and second sumps;
    a filter disposed about the third member and received in the annular cavity, the filter including:
       an outer portion in sealing contact with the first wall;
       an inner portion in sealing contact with the outer surface of the third member;
       a plurality of spokes extending radially between the outer and inner portions; and
       at least one filter element spanning between the plurality of spokes, the filter element being configured to permit fluid communication of the fluid between the first and second sumps and to inhibit passage of solid particulates between the first and second sumps.

11. The power transmitting device of claim 10, wherein the inner portion includes an inner ring and an arm, the inner ring being disposed about an inner circumference of the spokes, the arm having a first end coupled to the inner ring, the arm extending freely in a first axial direction from the first end to a second end, the second end being in sealing contact with the outer surface of the third member.

12. The power transmitting device of claim 11, wherein the filter includes a biasing member and the second end of the arm defines a groove, the groove extending around an outer circumference of the second end, the biasing member being disposed within the groove and biasing the second end radially inward.

13. The power transmitting device of claim 11, wherein the inner portion includes a resilient lip, the resilient lip extending radially inward from the inner ring and extending in a second axial direction opposite the first axial direction, the resilient lip being in sealing contact with the outer surface of the third member.

14. The power transmitting device of claim 11, wherein the outer portion includes an outer ring and a flange, the outer ring being disposed about an outer circumference of the spokes, the flange extending axially from the outer ring in the first axial direction and in sealing contact with the first wall.

15. The power transmitting device of claim 10, wherein the at least one filter element has an annular shape, the filter element spanning across a first side of each of the plurality of spokes.

16. The power transmitting device of claim 15, wherein the inner portion includes a cover portion that is formed over the filter element and the first side of the spokes to couple the filter element to the spokes.

17. The power transmitting device of claim 10, wherein the filter element is a mesh having a mesh size less than or equal to 200 μm and configured to inhibit passage of solid particulates greater than the mesh size between the spokes.

18. A power transmitting device comprising:
an input pinion configured for rotation about a first axis;
a housing having a first wall and defining a first cavity and a second cavity that is separated from the first cavity by the first wall;
a fluid received in the first and second cavities;
an input member being received in the first cavity and configured for rotation about a second axis, the input member being meshingly engaged with the input pinion;
a first output member and a second output member;
a differential including a differential case and a differential gearset, the differential case being configured to be drivingly coupled to the input member, the differential gearset being configured to transmit rotary power between the differential case and the first and second output members;
a clutch assembly being received in the second cavity and including a plurality of first clutch plates and a plurality of second clutch plates interleaved with the plurality of first clutch plates;
an intermediate member being received through the first wall and having an outer surface, the intermediate member being configured for rotation relative to the housing about the second axis and being drivingly coupled to the input member and the plurality of first clutch plates, the outer surface of the intermediate member and an inner surface of the first wall defining an annular cavity that fluidly couples the first and second cavities;
a filter received in the annular cavity and including:
a first body, the first body having a disc and a flange, the disc defining a first aperture and a second aperture. The intermediate member being received through the first aperture, the second aperture being radially between the first aperture and the flange and extending axially through the disc, the flange extending from the disc in a first axial direction and configured to form a seal with the inner surface of the first wall;
a filter element spanning the second aperture, the filter element being configured to permit fluid communication of the fluid between the first and second cavities through the second aperture and to inhibit passage of solid particulates between the first and second cavities; and
a second body, the second body coupled to the disc and configured to form a seal with the outer surface of the intermediate member.

19. The power transmitting device of claim 18, wherein the second body includes an inner portion and an outer portion, the inner portion extending radially inward from the disc to be in sealing contact with the outer surface of the intermediate member, the outer portion extending radially outward from the inner portion and encapsulating the filter element between the outer portion and the disc.

20. The power transmitting device of claim 18, wherein the second body includes an arm having a first end proximal to the disc, the arm extending freely in the first axial direction from the first end to a second end, the second end being in sealing contact with the outer surface of the intermediate member.

* * * * *